United States Statutory Invention Registration [19]

[11] Reg. Number: H794

Telmo et al. [43] Published: Jul. 3, 1990

[54] DISCARDING ROTATING BAND FOR PROJECTILE

[75] Inventors: Frisco T. Telmo, King George; Raymond D. Cooper, Bowling Green, both of Va.

[73] Assignee: The United States of America as represented by the Secretary of the Navy, Washington, D.C.

[21] Appl. No.: 405,826

[22] Filed: Sep. 8, 1989

[51] Int. Cl.[5] ..... F42B 13/00

[52] U.S. Cl. ..... 102/527

*Primary Examiner*—Harold J. Tudor

*Attorney, Agent, or Firm*—John D. Lewis; Kenneth E. Walden

[57] ABSTRACT

An improved rotating band for a projectile is disclosed. The rotating band comprises a plastic sleeve, two micarta inserts, and a retainer ring. One micarta insert, located in the middle of the plastic sleeve, contains grooves which increase the friction coefficient and elasticity of the rotating band. The second micarta insert, located further forward, provides additional barrel contact area. These improved characteristics enable the projectile to be retained in a hot gun when elevated or rammed at any velocity. A retainer ring is molded onto the aft end of the plastic sleeve to secure the invention to the projectile. The rotating band also acts as a seal and spins the projectile as it moves through the gun barrel. The rotating band disintegrates after the projectile exits the gun barrel.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
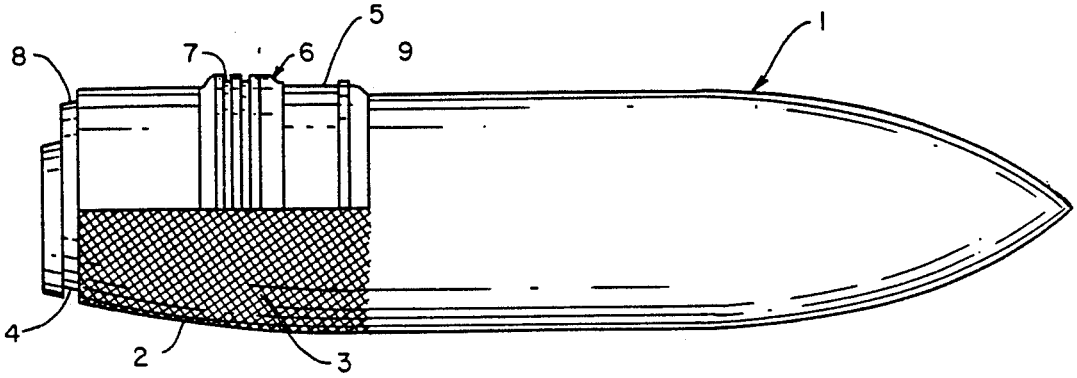
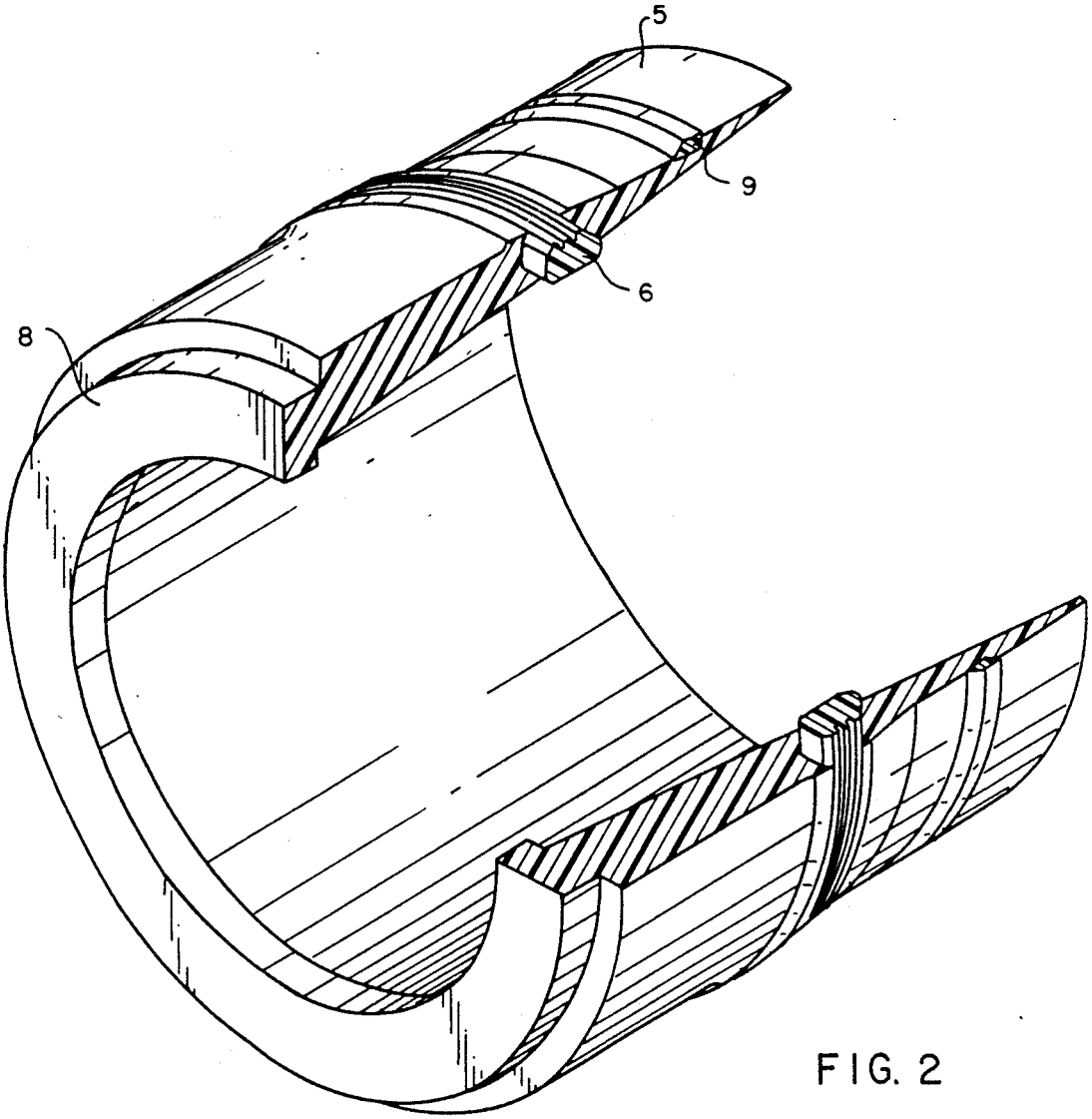
FIG. 2

DISCARDING ROTATING BAND FOR PROJECTILE

BACKGROUND OF THE INVENTION

This invention relates in general to projectiles and in particular to an improved rotating band for projectiles which are rammed into a forcing cone of a hot gun during loading. A particular feature is improved operation in gun firing solutions requiring elevated barrel angles.

The purpose of the rotating band are to hold the projectile in the forcing cone until firing and to spin the projectile as it leaves the gun barrel. Spinning the projectile is desired because it gives the projectile added stability and range while in flight. The rotating band also acts as a seal to keep the propellant gases from escaping past the projectile, resulting in more energy being delivered to the projectile at firing.

The metallic rotating bands which were first used were heavy and caused excessive wear on the gun barrel. Many variations using thermoplastic material have been tried to solve the problems associated with metallic bands. The plastic rotating bands were lighter and softer but posed additional problems. They would either slip from the projectile during flight, thereby reducing the spin rate and range, or would fall to retain the projectile in the forcing cone during loading. Discarding rotating bands, such as U.S. Pat. No. 3,744,426 to Butler, which were designed to break off after exiting the gun barrel, solved the in-flight stability problems. However, the materials and design used in the Butler patent and others were inadequate to solve the retention problem. High temperatures in the gun barrel, approaching 575° F., would simply melt the plastic bands, causing the projectile to fall out of the forcing cone when the gun barrel was elevated.

The plastic rotating bands were also very rigid. When the projectile was rammed into the forcing cone at approximately 24 feet per second, the plastic bands would either crack, become unseated, or cause the projectile to rebound. If the rotating band cracked or became unseated from the projectile, the effectiveness of the seal would decrease and the range of the projectile would be limited. Therefore, it became necessary to design a plastic rotating band which would solve the above problems without sacrificing the performance of the projectile. The subject invention meets these criteria.

SUMMARY OF THE INVENTION

The rotating band is designed for a projectile with a tapered aft end. The aft end of the projectile is knurled and there is a groove circumscribing the lower portion. The rotating band comprises a plastic sleeve which is positioned over the knurled portion of the aft end. A retainer ring, molded onto the end of the plastic sleeve, fits into the groove on the projectile to hold the rotating band in place. Embedded in the plastic sleeve are two thermoplastic rings. One thermoplastic ring is located in the middle of the plastic sleeve and the other is located near the top. The middle ring has grooves machined on the external surface. These grooves enhance the elasticity and friction coefficient of the thermoplastic ring, which result in better projectile retention and seal efficiency. The grooves also prevent cracking of the rotating band and rebounding of the projectile during hot gun loading.

During loading, the projectile is retained in the gun barrel due to the interaction of the thermoplastic rings with the walls of the forcing cone. The projectile will remain in the forcing cone for temperatures up to 800° F. even when the gun is elevated. When the gun is fired, the thermoplastic rings and plastic sleeve engrave in the rifling in the gun barrel which causes the projectile to spin. The rotating band disintegrates into very small fragments after the projectile leaves the gun barrel.

OBJECTS OF THE INVENTION

An object of the present invention is to hold the projectile in the forcing cone of a gun at high temperatures for a time sufficient to allow firing of the projectile at any gun elevation.

Another object is to prevent cracking or unseating of the rotating band caused by ramming of the projectile into the forcing cone during loading.

A further object is to make the rotating band break off the projectile and disintegrate after exiting the gun barrel.

Other objects, advantages, and novel features of the present invention will become apparent after reading the detailed description and viewing the associated drawings.

BRIEF DESCRIPTION OF THE DRAWINGS

FIG. 1 is a drawing of the projectile with the rotating band attached.

FIG. 2 is a cross-sectional view of the rotating band of FIG. 1.

DETAILED DESCRIPTION OF THE INVENTION

Figure 3:
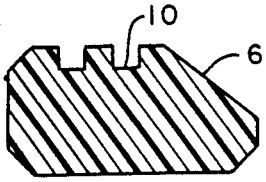
FIG. 3 is a cross-sectional view of one embodiment of a thermoplastic ring with square grooves which may be used with the projectile of FIG. 1.

FIG. 1 shows the projectile with the rotating band. The projectile has a metallic subcaliber core 1 and a tapered aft end 2. A groove 4 circumscribes the lower portion of the aft end. A section of the rotating band is cut away to show the knurled section 3 of the projectile over which a plastic sleeve 5 rests. One thermoplastic ring 6 is located in the middle of the plastic sleeve 5 and has grooves 7 machined around the projectile axis. A second thermoplastic ring 9 is located near the top of the plastic sleeve 5 and has no grooves. A retainer ring 8 is molded onto the rear of the plastic sleeve 5.

FIG. 2 shows a cross-sectional view of the plastic sleeve 5 with the thermoplastic rings 6, 9 embedded within. The plastic sleeve 5 and retainer ring 8 are both plastic, preferably 6/12 nylon, and are molded as a single part around the thermoplastic rings 6, 9 by injection molding. The preferred material for the thermoplastic rings 6, 9 is a laminated cotton cloth-filled epoxy micarta insert. The micarta insert is rigid and can withstand temperatures over 800° F., making it ideal for retaining the projectile in a hot gun.

Figure 4:
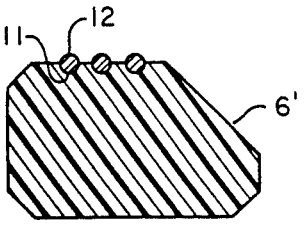
FIG. 4 is a cross-sectional view of another embodiment of a thermoplastic ring with round grooves filled with metallic wire which may be used with the projectile of FIG. 1.
Figure 5:
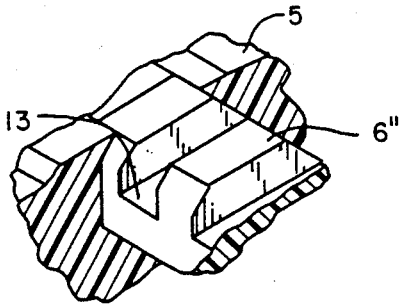
FIG. 5 is a cross-sectional view of a further embodiment of a thermoplastic ring with grooves machined parallel to the projectile axis which may be used with the projectile of FIG. 1.

FIGS. 3, 4, and 5 are cross-sectional view of three different configurations for the grooves 7 on the middle thermoplastic ring 6. The grooves are essential to the performance of the rotating band. Although the micarta insert provides the necessary heat resistance, it may be too rigid to wedge into the forcing cone. The grooves increase both the elasticity and the friction coefficient of the middle thermoplastic ring 6, resulting in better retention of the projectile in the forcing cone. Former problems involving cracking of the rotating band or rebounding of the projectile during loading are eliminated.

Figure 6:
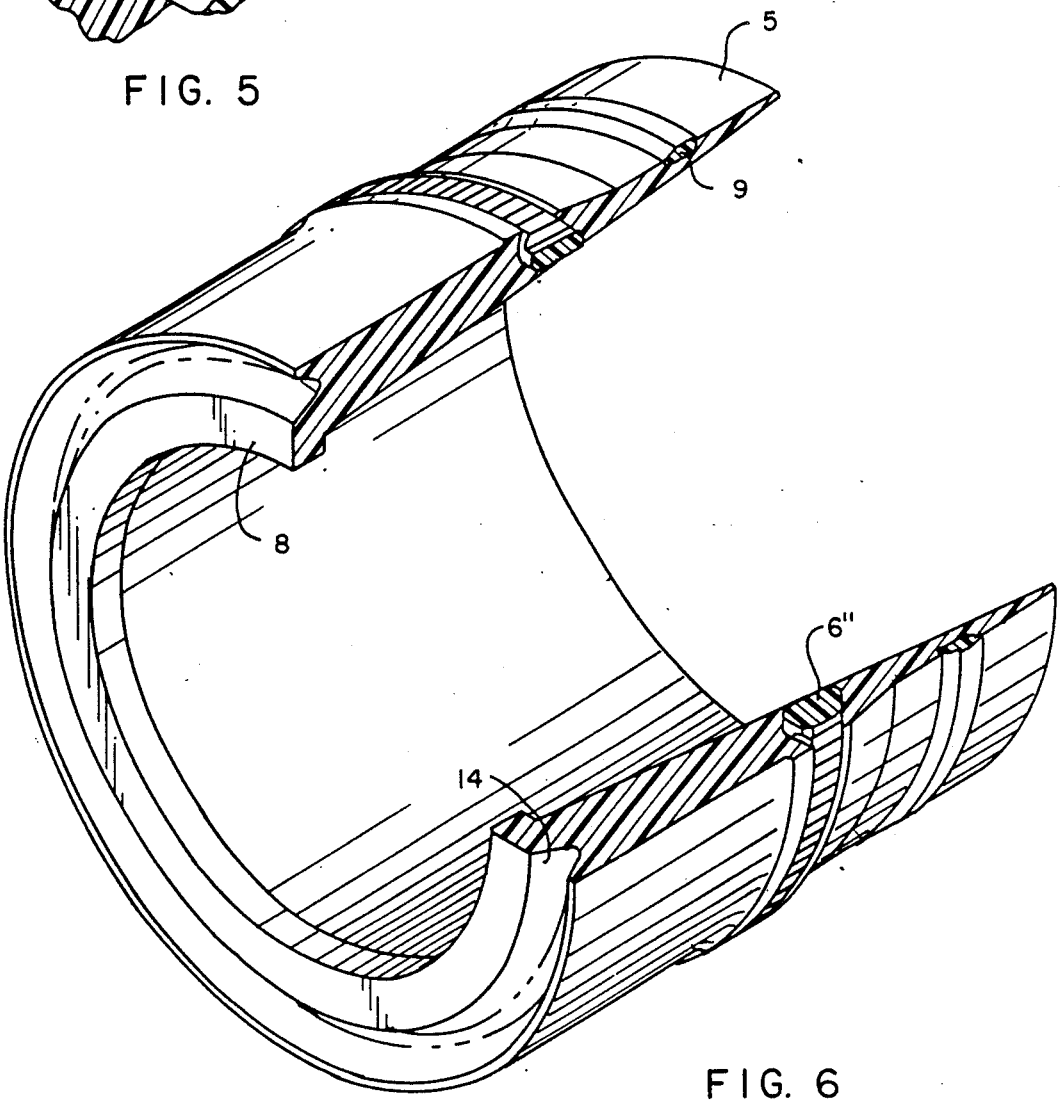
FIG. 6 is another embodiment of the rotating band of FIG. 2 with a V-shaped groove machined on the bottom of the retainer ring.

Referring to FIG. 3, square grooves 10 are machined onto the middle thermoplastic ring 6. FIG. 4 discloses round grooves 11 filled with wire 12. Copper, gilding, or steel wire can be molded or pressed into the round grooves 11. FIG. 5 discloses grooves 13 on the thermoplastic ring 6 which are machined parallel to the projectile axis. These grooves 13 are in the shape of a spur gear. Referring to FIG. 6, a V-shaped groove 14 is cut on the bottom of the retainer ring 8. This V-shaped groove 14 acts to increase the efficiency of the steel formed by the rotating band. The V-shaped groove 14 has been used in conjunction with the groove pattern disclosed in FIG. 5, but is not limited to this use.

All three configurations have been tested except FIG. 4 and have retained the projectile in the forcing cone at a temperature of 800° F. for at least 30 seconds even when the gun was elevated to an angle of 60 degrees. No rebounding or cracking occurred when the projectile was rammed at various speeds. These results prove that the subject invention will solve the problems associated with the earlier rotating band. Other groove patterns are possible in light of the teachings herein.

The rotating band is heated to 140° F. and is attached to the projectile's aft end by pressing the plastic sleeve 5 onto the projectile's aft end until the retainer ring 8 fits into the aft end groove 4. Knurling 3 of the aft end also serves to hold the rotating band in place.

The projectile is loaded into the gun by ramming the projectile into the gun's forcing cone. The forcing cone holds the projectile while the propelling charge is loaded. The ramming of the projectile wedges the thermoplastic rings 6, 9 against the walls of the forcing cone. The grooved thermoplastic ring 6, which acts as a shock absorber in conjunction with ring 9, retains the projectile in the hot forcing cone. Both thermoplastic rings 6, 9 prevent the plastic sleeve 5, with its lower melting point, from touching the hot walls of the forcing cone. When the propellant is detonated, the hot gases force the projectile through the gun barrel. The thermoplastic rings 6, 9 and the plastic sleeve 5 engage the rifling inside the gun barrel which imparts a spin on the projectile. When the projectile leaves the gun barrel, the spinning motion causes the rotating band to break off and disintegrate without harming surrounding personnel or equipment.

What is claimed is:

1. A rotating band for a projectile having a tapered art end comprising:
   - a plastic sleeve circumscribing the tapered aft end;
   - one or more thermoplastic rings embedded in said plastic sleeve;
   - one or more grooves formed on the exterior of at least one of said thermoplastic rings;
   - a retainer ring molded on the bottom of said plastic sleeve.

2. The rotating band of claim 1 wherein the grooves of said thermoplastic ring are machined perpendicular to the projectile axis.

3. The rotating band of claim 2 wherein said grooves of said thermoplastic ring are square.

4. The rotating band of claim 2 wherein said grooves of said thermoplastic ring are round.

5. The rotating band of claim 4 wherein said round grooves of said thermoplastic ring are filled with metal wire.

6. The rotating band of claim 4 wherein said round grooves of said thermoplastic ring are filled with copper wire.

7. The rotating band of claim 4 wherein said round grooves of said thermoplastic ring are filled with gilding wire.

8. The rotating band of claim 4 wherein said round grooves of said thermoplastic ring are filled with steel wire.

9. The rotating band of claim 1 wherein the grooves of said thermoplastic ring are machined parallel to the projectile axis.

10. The rotating band projectile of claim 1 wherein a V-shaped groove is cut on the bottom of said retainer ring.

11. The rotating band of claim 1 wherein said plastic sleeve and said retainer ring are composed of nylon.

12. The rotating band of claim 1 wherein said thermoplastic rings are composed of micarta.

* * * * *